No. 805,949. PATENTED NOV. 28, 1905.
U. FACETTE.
STAGING CLAMP.
APPLICATION FILED FEB. 6, 1905.

Inventor
Uldége Facette,

UNITED STATES PATENT OFFICE.

ULDÈGE FACETTE, OF HARTFORD, CONNECTICUT.

STAGING-CLAMP.

No. 805,949. Specification of Letters Patent. Patented Nov. 28, 1905.

Application filed February 6, 1905. Serial No. 244,342.

*To all whom it may concern:*

Be it known that I, ULDÈGE FACETTE, a citizen of the Dominion of Canada, residing at Hartford, in the county of Hartford and State of Connecticut, have invented certain new and useful Improvements in Staging-Clamps, of which the following is a specification.

This invention relates to staging-clamps, and has for its object the provision of improvements in such devices whereby a much better clamping action is obtained than is the result with structures heretofore in use, and simplicity of construction is assured.

A further object of the invention is the provision of a staging-clamp of angular form, one arm of which is provided with a seat or ledge for the horizontal timber and the other arm with an adjustable clamp proper and with a cam-lever for actuating said clamp proper.

Other objects of the invention will hereinafter appear.

Figure 1:
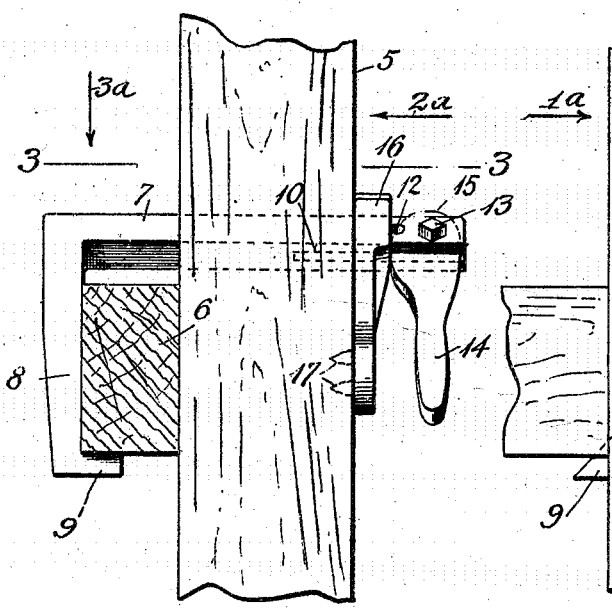
Figure 2:
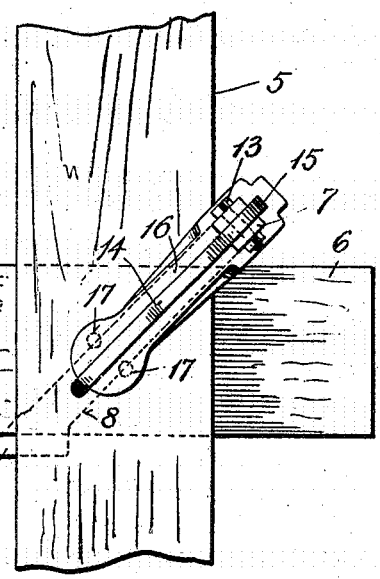
Figure 3:
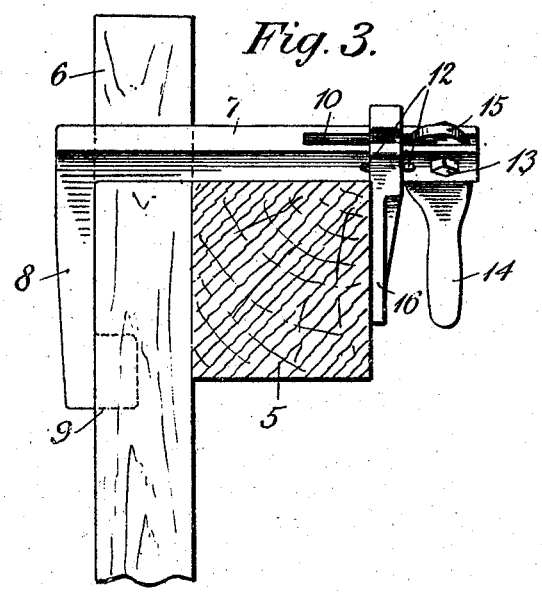
Figure 4:
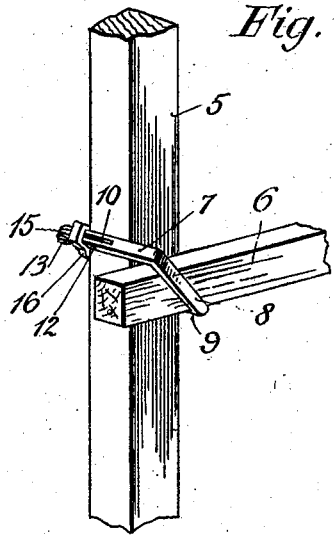

In the accompanying drawings, Figure 1 is a view of part of the timbers of a staging, showing the vertical and horizontal timbers thereof and the clamp in position on said timbers, the line of section being indicated by the arrow 1ª in Fig. 2. Fig. 2 is a view on line 2ª of Fig. 1. Fig. 3 is a section on line 3 3 of Fig. 1. Fig. 4 is a perspective view showing two of the timbers and the improved clamp uniting them.

Like numerals designate similar parts throughout the several views.

Referring to the drawings, the numeral 5 designates one of the vertical timbers of a staging, and 6 one of the horizontal timbers or stringers thereof. For temporarily clamping said timbers together a clamp comprising an angular casting is employed, and this casting is provided with a long arm 7 and with an arm 8, provided with a ledge or shoulder 9 inclined to the plane of the arms and upon which the horizontal timber 6 rests.

As shown, each arm of the clamp is of angular cross-section, and the long arm is slotted or bifurcated at 10 and is provided with a series of holes 12 for the reception of a bolt 13. On this bolt and in the slot of the clamp is pivoted a hand-lever 14, having a cam-shaped end 15, and said cam-shaped end bears against a clamping-arm 16, apertured at its upper end to fit upon the arm 7. At its free end this clamping-arm is equipped with teeth 17, which when the lever is forced forward by the cam will enter the wood of the vertical upright 5, as shown by dotted lines in Fig. 1, and aid in securing the parts together.

When the lever 14 is actuated, it will force the clamping-arm 16 inward against the upright 5, causing the teeth 17 to enter the same, and then will pull the clamp bodily forward, causing the arm 8 thereof firmly to bind the stringer 6 against the upright 5 and to secure the same rigidly in position, as illustrated in Figs. 1, 3, and 4.

As will be seen, provision is made for fitting the clamp to various sizes of timber by adjusting the pivot 13 of the hand-lever along the bar 7, thus enabling the clamping-bar to be forced against the timber 5.

While the projection of arm 8 is shown of rounded form to support the horizontal timber 6, it is distinctly to be understood that it may be inclined or be of other forms suitable to accomplish the required result, if desired.

The space in which the stringer 6 is supported is practically a loop, and it is large enough to accommodate the sizes of stringer required.

In the operation of the invention the clamp is adjusted to the vertical timber in the manner shown in Fig. 4, the loop receiving the stringer 6, and when the parts have been thus located the lever 14 is actuated to force the clamping-bar 16 forward against the timber 5, as shown in Figs. 1 and 3, thereby securely locking the stringer 6 in place.

Changes may be made in the details of the clamp without departure from the invention, which is not limited to the precise devices shown and described.

Having thus described my invention, what I claim is—

1. A staging-clamp comprising a bar having arms at an angle to each other, a support for a stringer projecting laterally from and inclined to the plane of the arms on one of the arms, a clamping-plate, and means for actuating said clamping-plate carried by the other arm.

2. A staging-clamp consisting of a bar having two arms, one of which is provided with a lateral support inclined to the plane of the arms for a stringer, and the other of which is bifurcated, a clamping-plate fitted for sliding movement on the bifurcated arm, and a lever having a cam bearing against said clamping-arm.

3. A staging-clamp comprising a bar having arms at right angles to each other, one arm having a lateral support inclined to the plane of the arms for a stringer, and the other being bifurcated and provided with a series of perforations, a clamping-plate having a spur for entering an upright, said plate being fitted on the bifurcated arm, a cam-lever, and a bolt on which the cam-lever is pivoted, said bolt being adapted to be inserted in any perforation of the arm.

In testimony whereof I affix my signature in presence of two witnesses.

ULDÈGE FACETTE.

Witnesses:
 J. FACETTE,
 WM. H. BLODGETT.